(12) United States Patent
Takahashi

(10) Patent No.: US 12,305,335 B2
(45) Date of Patent: May 20, 2025

(54) TISSUE PAPER AND METHOD FOR MANUFACTURING TISSUE PAPER

(71) Applicant: DAIO PAPER CORPORATION, Ehime (JP)

(72) Inventor: Sachiko Takahashi, Ehime (JP)

(73) Assignee: DAIO PAPER CORPORATION, Ehime (JP)

( * ) Notice: Subject to any disclaimer, the term of this patent is extended or adjusted under 35 U.S.C. 154(b) by 196 days.

(21) Appl. No.: 18/248,764

(22) PCT Filed: Nov. 26, 2021

(86) PCT No.: PCT/JP2021/043437
§ 371 (c)(1),
(2) Date: Apr. 12, 2023

(87) PCT Pub. No.: WO2022/114139
PCT Pub. Date: Jun. 2, 2022

(65) Prior Publication Data
US 2023/0383470 A1 Nov. 30, 2023

(30) Foreign Application Priority Data

Nov. 30, 2020 (JP) .................. 2020-198096

(51) Int. Cl.
*D21H 27/00* (2006.01)
*D21F 5/18* (2006.01)
(Continued)

(52) U.S. Cl.
CPC .......... *D21H 27/005* (2013.01); *D21F 5/181* (2013.01); *D21G 3/04* (2013.01); *D21H 17/00* (2013.01);
(Continued)

(58) Field of Classification Search
CPC ...... D21H 27/005; D21H 17/00; D21H 21/22; D21H 23/04; D21H 27/02; D21H 19/30;
(Continued)

(56) References Cited

U.S. PATENT DOCUMENTS 11,384,483 B2 * 7/2022 Takahashi .............. A47K 10/16
2020/0407922 A1 * 12/2020 Yasui ..................... D21H 17/06
(Continued)

FOREIGN PATENT DOCUMENTS

EP           2792790        9/2016
EP           4253652 A1 *  10/2023  ............. D21F 5/181
(Continued)

OTHER PUBLICATIONS

Machine Translation of JP-2016204773 A. (Year: 2016).*
(Continued)

*Primary Examiner* — Jose A Fortuna
(74) *Attorney, Agent, or Firm* — IPUSA, PLLC

(57) ABSTRACT

Tissue paper containing a softener and having a dry tensile strength of 250 cN/25 mm or greater and 400 cN/25 mm or less in a longitudinal direction, a tensile elasticity of 7 N/mm² or higher and 15 N/mm² or lower, and a hand-feel value HF of 80 or higher, where the hand-feel value is measured using a softness analyzer (TSA), is provided.

7 Claims, 8 Drawing Sheets

(51) Int. Cl.
*D21G 3/04* (2006.01)
*D21H 17/00* (2006.01)
*D21H 21/22* (2006.01)
*D21H 23/04* (2006.01)
*D21H 27/02* (2006.01)

(52) U.S. Cl.
CPC ............ *D21H 21/22* (2013.01); *D21H 23/04* (2013.01); *D21H 27/02* (2013.01)

(58) Field of Classification Search
CPC .... D21H 21/146; D21H 27/002; D21F 5/181; D21G 3/04; A47K 10/16; C09J 179/08
See application file for complete search history.

(56) References Cited

U.S. PATENT DOCUMENTS

| | | | | |
|---|---|---|---|---|
| 2022/0106740 | A1* | 4/2022 | Tomioka | D21H 27/30 |
| 2023/0383470 | A1* | 11/2023 | Takahashi | D21H 27/005 |
| 2024/0052576 | A1* | 2/2024 | Takahashi | D21H 21/14 |
| 2024/0076835 | A1* | 3/2024 | Takahashi | D21H 27/002 |
| 2024/0084513 | A1* | 3/2024 | Takahashi | D21H 23/04 |

FOREIGN PATENT DOCUMENTS

| | | | | |
|---|---|---|---|---|
| JP | 2016-204773 | | 12/2016 | |
| JP | 2017-176482 | | 10/2017 | |
| JP | 2020-033672 | | 3/2020 | |
| JP | 2020-124339 | | 8/2020 | |
| JP | 2020-182741 | | 11/2020 | |
| JP | 2022086206 A | * | 6/2022 | ............ D21F 5/181 |
| JP | 7552980 B2 | * | 9/2024 | ............ D21F 5/181 |
| WO | 2016/204078 | | 12/2016 | |
| WO | 2018/175484 | | 9/2018 | |
| WO | WO-2019108188 A1 | * | 6/2019 | ............ D21F 11/006 |
| WO | 2019/167747 | | 9/2019 | |
| WO | WO-2019190514 A1 | * | 10/2019 | ........... B32B 29/005 |
| WO | 2020/162319 | | 8/2020 | |
| WO | WO-2022114139 A1 | * | 6/2022 | ............ D21F 5/181 |

OTHER PUBLICATIONS

Machine Translation of JP-2017176482 A. (Year: 2017).*
Machine Translation of WO 2016/204078 A. (Year: 2016).*
International Search Report for PCT/JP2021/043437 filed on Feb. 15, 2022.
Extended European Search Report for 21898111.6 mailed on Jul. 29, 2024.

* cited by examiner

TISSUE PAPER AND METHOD FOR MANUFACTURING TISSUE PAPER

TECHNICAL FIELD

The present invention relates to tissue paper and a method for manufacturing tissue paper.

BACKGROUND ART

In recent years, the need for soft tissue paper has been increasing. Tissue paper contains a softener for softening the paper. Moreover, tissue paper has a predetermined tensile strength in order not to be torn (for example, see Patent Document 1: Japanese Laid-open Patent Publication No. 2020-182741).

RELATED-ART DOCUMENTS

Patent Documents

Patent Document 1: Japanese Laid-open Patent Publication No. 2020-182741

SUMMARY OF THE INVENTION

Problem to be Solved by the Invention

Increasing the amount of the softener that is added to existing tissue paper, on the contrary, does not make paper soft, because the paper fails to stick to a dryer during drying and because, this in turn, makes the paper difficult to crepe. Reducing tensile strength makes the paper soft, but makes the paper more likely to be torn. Hence, there has been a limit to the extent that softness of the existing tissue paper could be improved.

It is an object of the present invention to provide tissue paper having excellent softness.

Means to Solve the Problem

Tissue paper according to an embodiment of the present invention contains a softener, and has a dry tensile strength of 250 cN/25 mm or greater and 400 cN/25 mm or less in a longitudinal direction, a tensile elasticity of 7 N/mm$^2$ or higher and 15 N/mm$^2$ or lower, and a hand-feel value HF of 80 or higher, where the hand-feel value is measured using a softness analyzer (TSA).

Effects of the Invention

According to an embodiment of the present invention, it is possible to provide tissue paper having excellent softness.

MODE FOR CARRYING OUT THE INVENTION

Figure 1:
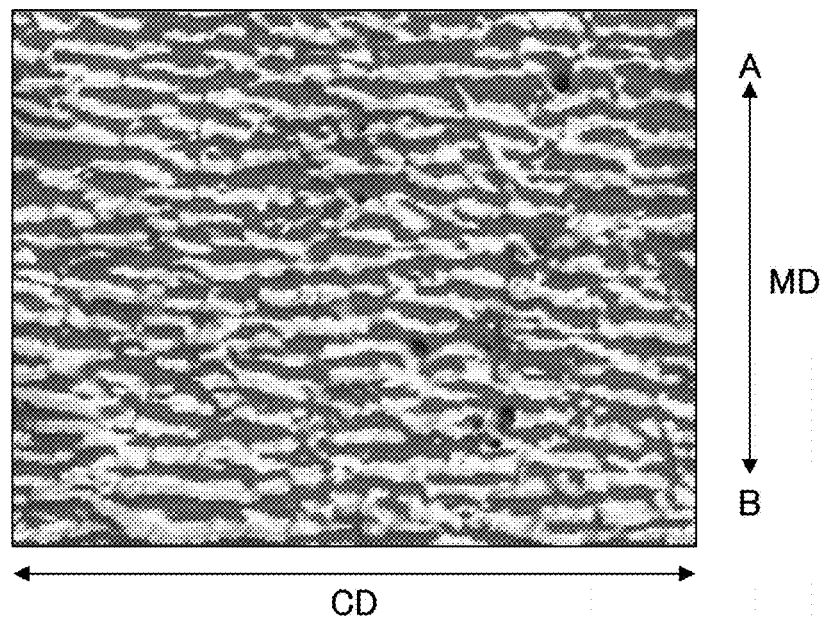
FIG. 1 is a view illustrating an image of a surface of tissue paper according to an embodiment of the present invention, measured by an image analysis.

Embodiments of the present invention will be described in detail with reference to the drawings. In the drawings, any common components will be denoted by the same reference numerals, and descriptions of such components may be skipped. In the drawings, the components may not be to scale.

<Tissue Paper>

Tissue paper according to an embodiment will be described. FIG. 1 is a view illustrating an image of a surface of the tissue paper according to the present embodiment, measured by an image analysis. In the present embodiment, the material of the tissue paper is paper. As the pulp composition of the paper, a composition that is publicly known in the field of paper may be used. For example, the pulp blend proportion may be 50% by mass or greater, preferably 90% by mass or greater, and more preferably 100% by mass.

The basis weight (also referred to as paper density) of the paper is not particularly limited, yet is, for example, 5 g/m$^2$ or greater and 80 g/m$^2$ or less, preferably 7 g/m$^2$ or greater and 50 g/m$^2$ or less, and more preferably 10 g/m$^2$ or greater and 13 g/m$^2$ or less depending on the ply rating of the tissue paper. The basis weight can be measured in accordance with the rule of Japanese Industrial Standards (JIS) P 8124.

The thickness of the paper (hereinafter, referred to as paper thickness) is not particularly limited, yet is, for example, 50 μm or greater and 500 μm or less, preferably 60 μm or greater and 330 μm or less, and more preferably 100 μm or greater and 150 μm or less for two-ply paper. The paper thickness can be measured in accordance with the rule of JIS P 8111 (1998).

The form of the tissue paper is not particularly limited. However, general-purpose tissue paper (excluding tissue paper containing a moisturizing ingredient) is preferable. The tissue paper can be applied to any of industrial use, home use, and portable use. Among these, the tissue paper is favorably used as home-use tissue paper.

The tissue paper according to the present embodiment contains a softener. In the present specification, a softener contains a component that imparts softness to the paper constituting the tissue paper. Specifically, the softener has a function of broadening the gaps between pulp fibers, and can soften the paper by making the pulp fibers be sparsely distributed by forming air layers between the pulp fibers and infiltrating also the gaps between the pulp fibers. Moreover, by adhering to the surface of the pulp, the softener can reduce friction against skin and impart smoothness to the paper.

The component contained in the softener is not particularly limited. Examples of the component include fatty acid ester-based compounds and fatty acid amide-based compounds. When using a fatty acid ester-based compound and a fatty acid amide-based compound, it is optional whether to use either one or both in combination. When using both in combination, the blending ratio of the fatty acid ester-based compound to the fatty acid amide-based compound in the softener may be desirably selected. However, the content ratio of the fatty acid ester-based compound to the fatty acid amide-based compound is preferably from 1:1 through 1:5.

As the fatty acid ester-based compound contained in the softener, a compound of an alcohol containing from 6 through 24 carbon atoms and a fatty acid containing from 7 through 25 carbon atoms is preferable.

The alcohol containing from 6 through 24 carbon atoms may be any selected from straight-chain alcohols, alcohols having a branched chain, saturated alcohols, and unsaturated alcohols. Among these, alcohols containing from 10 through 22 carbon atoms are preferable, and lauryl alcohol, myristyl alcohol, cetyl alcohol, stearyl alcohol, behenyl alcohol, and oleyl alcohol are more preferable. One of these alcohols may be used alone or two or more of these alcohols may be used in combination.

The fatty acid containing from 7 through 25 carbon atoms may be any selected from straight-chain fatty acids, fatty acids having a branched chain, saturated fatty acids, and unsaturated fatty acids. Among these, fatty acids containing from 10 through 22 carbon atoms are preferable, and lauric acid, myristic acid, palmitic acid, stearic acid, behenic acid, and oleic acid are more preferable. One of these fatty acids may be used alone or two or more of these fatty acids may be used in combination.

It is possible to obtain a fatty acid amide-based compound contained in the softener, by allowing polyalkylene polyamine and carboxylic acid to react. A preferable polyalkylene polyamine is one that is represented by General formula (1) below, containing at least three amino groups in a molecule.

$$H_2N-(R1-NH-)_n-R1-NH_2 \quad (1)$$

(Each R1 independently represents an alkylene group containing from 1 through 4 carbon atoms, and n represents an integer of from 1 through 3.)

This polyalkylene polyamine may contain different kinds of R1 in a molecule.

It is also possible to use two or more kinds of polyalkylene polyamines. A preferable R1 is an ethylene group.

Meanwhile, as the carboxylic acid, carboxylic acid containing from 10 through 24 carbon atoms is preferable, and the carboxylic acid may be any selected from saturated carboxylic acids and unsaturated carboxylic acids. Moreover, the carboxylic acid may be any selected from straight-chain carboxylic acids and carboxylic acids having a branched chain. Among these, carboxylic acids containing from 12 through 22 carbon atoms are preferable, and carboxylic acids containing from 14 through 18 carbon atoms are more preferable.

In the tissue paper according to the present embodiment, it is preferable that the softener contains an oil by 0.1% by mass or greater and 1.5% by mass or less, more preferably 0.1% by mass or greater and 1.4% by mass or less, and yet more preferably 0.1% by mass or greater and 1.3% by mass or less in the softener, the oil being extractable with diethyl ether (hereinafter, the oil may be referred to as an extractable oil). Here, diethyl ether efficiently extracts oils and fats, which are low-polarity substances.

Typically, such an oil (oil component) is not contained in pulp, which is the main raw material of tissue paper, but is contained in a softener. The range of 0.1% by mass or greater and 1.5% by mass or less by which the oil is contained is a high range of contents not found in existing tissues irrespective of the basis weight of the tissue paper.

The dry tensile strength of the tissue paper according to the present embodiment in a longitudinal direction is 250 cN/25 mm or greater and 400 cN/25 mm or less, preferably 260 cN/25 mm or greater and 380 cN/25 mm or less, and more preferably 270 cN/25 mm or greater and 350 cN/25 mm or less.

Figure 4:
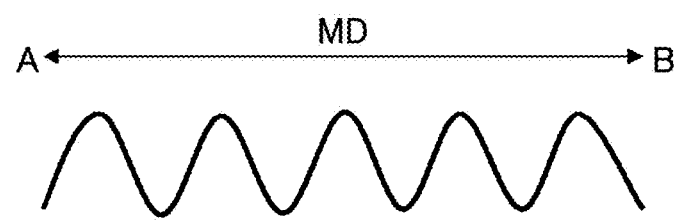
FIG. 4 is an exemplary view illustrating a cross-section of the tissue paper of FIG. 1 taken in a flow direction.

Here, the longitudinal direction represents the flow direction (MD direction) during a manufacturing process for manufacturing the tissue paper (FIG. 1 and FIG. 4). The dry tensile strength in the longitudinal direction represents strength by which the tissue paper in a dry state is pulled in the flow direction (MD direction) during the manufacturing process.

The dry tensile strength of the tissue paper according to the present embodiment in the transverse direction may be selected as desired, and is adjusted to, for example, 50 cN/25 mm or greater and 200 cN/25 mm or less, preferably 80 cN/25 mm or greater and 180 cN/25 mm or less, and more preferably 100 cN/25 mm or greater and 150 N/25 mm or less.

Here, the transverse direction represents a direction (CD direction) orthogonal to the flow direction (MD direction) during a manufacturing process for manufacturing the tissue paper (FIG. 1). The dry tensile strength in the transverse direction represents strength by which the tissue paper in a dry state is pulled in the direction (CD direction) orthogonal to the flow direction during the manufacturing process.

The tensile elasticity of the tissue paper according to the present embodiment is preferably 7 N/mm² or higher and 15 N/mm² or lower, more preferably 8 N/mm² or higher and 13 N/mm² or lower, and yet more preferably 8.5 N/mm² or higher and 11 N/mm² or lower.

Figure 8:
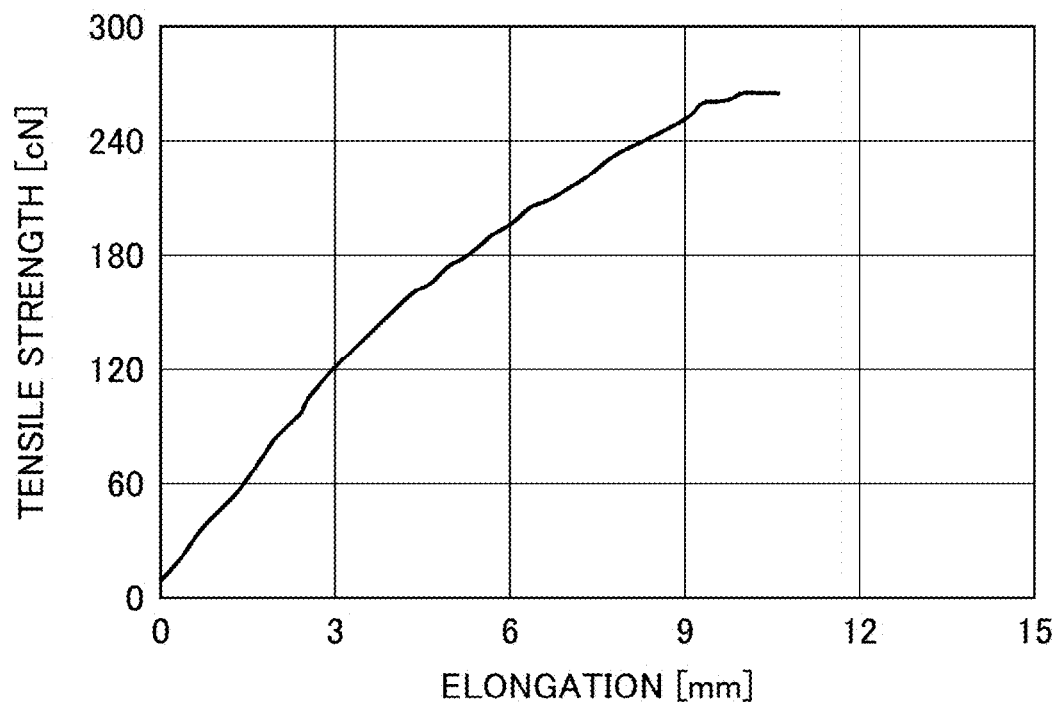
FIG. 8 is a graph plotting tensile elasticity of tissue paper according to an embodiment of the present invention.

Here, the tensile elasticity represents Young's modulus calculated according to Formula (1) below based on tensile strength in the longitudinal direction measured using a tensile compression tester (available from MinebeaMitsumi Inc., TGI-200N) while sandwiching the measurement test piece sample having a width of 25 mm and a paper thickness of 125 μm (on the average) from above and below between chucks (having a distance of 100 mm between the chucks) (see FIG. 8).

Maximum slope (N/mm) of elongation-tensile strength curve×distance (mm) between chucks/ width (mm) of test piece sample/thickness (mm) of test piece sample     (1)

The rate of elongation of the tissue paper according to the present embodiment in the longitudinal direction may be selected as desired, and is adjusted to, for example, 5% or higher and 20% or lower, preferably 8% or higher and 18% or lower, and more preferably 10% or higher and 15% or lower. Here, the rate of elongation in the longitudinal direction is the percentage representation of the length of the tissue paper at the moment the tissue paper is torn as a result of being pulled in a dry state in the flow direction (MD direction) during the manufacturing process.

The hand-feel value HF of the tissue paper according to the present embodiment measured using a softness analyzer (TSA) is preferably 80 or higher, more preferably 81 or higher, and yet more preferably 83 or higher. Here, the softness analyzer (TSA) represents a tissue softness analyzer (TSA) available from Emtec Electronic GmbH.

The softness analyzer (TSA) (hereinafter, referred to as TSA) is an instrument configured to measure properties of flat and soft materials, such as tissue, cloth, and leather. The hand-feel value HF (hereinafter, referred to as HF value) is calculated from three parameters representing softness, smoothness, and stiffness measured using the TSA.

To calculate the hand-feel value HF, a FACIAL III, which is a standard algorithm available from Emtec Electronic GmbH, is used. The HF value represents a tendency that something feels softer the higher the value is.

The softness peak TS7 of the tissue paper according to the present embodiment measured using the softness analyzer (TSA) is preferably 11 or lower, more preferably 10.9 or lower, and yet more preferably 10.8 or lower.

Here, the softness peak TS7 (hereinafter, referred to as TS7) represents a softness parameter measured using the TSA. TS7 represents a tendency that something feels softer the lower the value is. TS7 is used for calculation of the hand-feel value HF described above.

The smoothness peak TS750 of the tissue paper according to the present embodiment measured using the softness analyzer (TSA) is preferably 9.5 or lower, more preferably 9.45 or lower, and yet more preferably 9.4 or lower.

Here, the smoothness peak TS750 represents a smoothness parameter measured using the TSA. TS750 represents a tendency that something feels smoother the lower the value is. TS750 is used for calculation of the hand-feel value HF together with TS7 described above.

Figure 2:
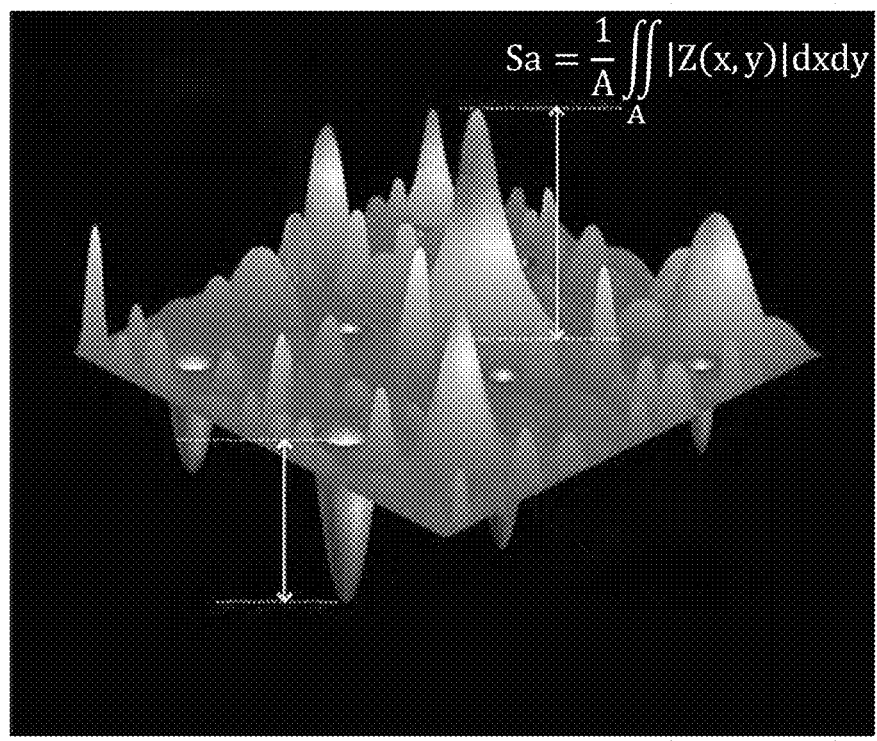
FIG. 2 is an image diagram for explaining arithmetic mean height.

The arithmetic mean height of the tissue paper according to the present embodiment is preferably 3 μm or greater and 7 μm or less, more preferably 4 μm or greater and 6.5 μm or less, and yet more preferably 5 μm or greater and 6 μm or less. Here, the arithmetic mean height represents the mean of the absolute values of the height differences of individual points from the mean plane of the surface (see FIG. 2).

Figure 3:
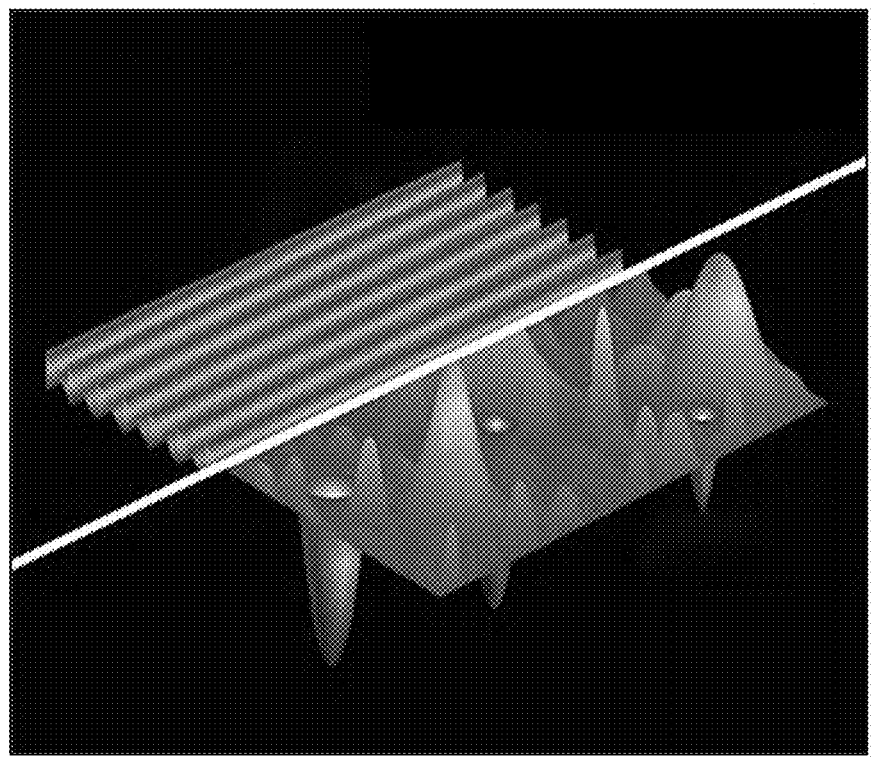
FIG. 3 is an image diagram for explaining a surface texture aspect ratio.

The aspect ratio of the tissue paper according to the present embodiment is preferably 0.4 or less, more preferably 0.35 or less, and yet more preferably 0.3 or less. Here, the aspect ratio represents whether the surface texture is isotropic or anisotropic. The surface texture aspect ratio assumes a value of from 0 through 1, and represents a tendency the something feels smoother the closer to 0 the value is (see FIG. 3).

Figure 5:
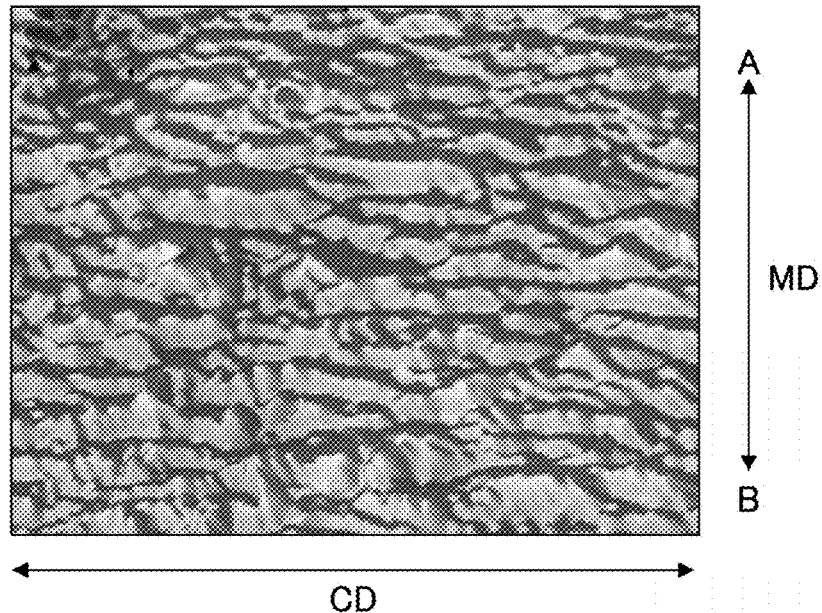
FIG. 5 is a view illustrating an image of a surface of existing tissue paper, measured by an image analysis.
Figure 6:
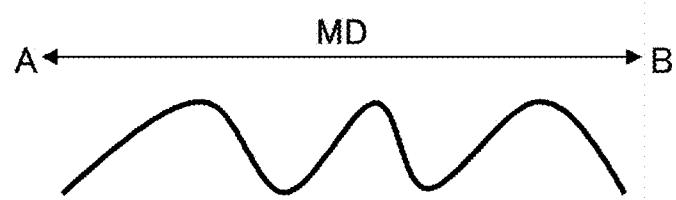
FIG. 6 is an exemplary view illustrating a cross-section of the tissue paper of FIG. 5 taken in a flow direction.
Figure 7:
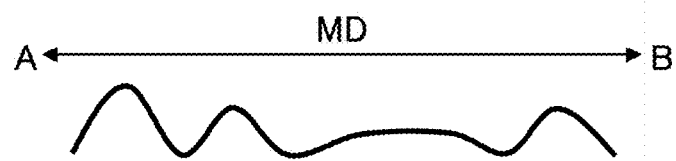
FIG. 7 is an exemplary view illustrating a cross-section of the tissue paper of FIG. 5 taken in a flow direction.

FIG. 4 is an exemplary view illustrating a cross-section of the tissue paper taken from A to B in the flow direction (MD direction) of FIG. 1. FIG. 5 is a view illustrating an image of a surface of existing tissue paper, measured by an image analysis. FIG. 6 and FIG. 7 are exemplary views illustrating cross-sections of the tissue paper of FIG. 5 taken from A to B in the flow direction (MD direction).

Figure 9:
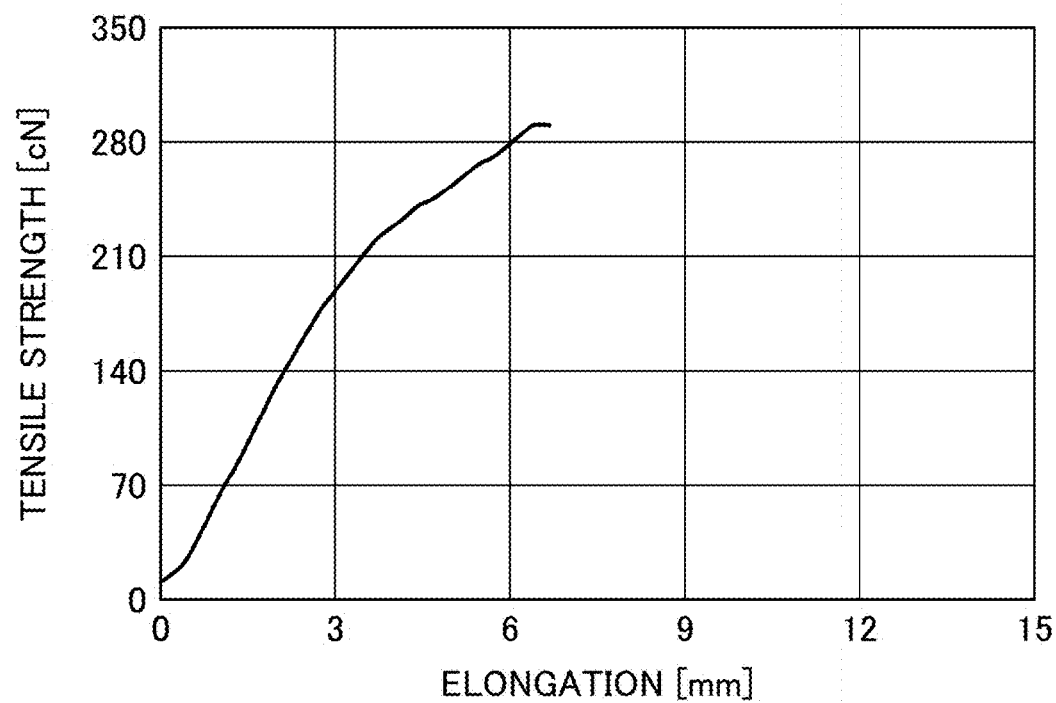
FIG. 9 is a graph plotting tensile elasticity of existing tissue paper.

The existing tissue paper is limited in terms of improvement of softness and smoothness, because of, for example, existence of large crepes in some regions as illustrated in FIG. 5 and FIG. 6, and nonuniformity of crepes and inexistence of crepes in some regions as illustrated in FIG. 5 and FIG. 7. Moreover, the existing tissue paper has a tendency of having a smaller elongation, a larger slope, a higher tensile elasticity, and a harder feel to it (FIG. 9).

As compared with this, it is possible to provide the tissue paper according to the present embodiment with uniform and minute crepes as illustrated in FIG. 1 and FIG. 4. Moreover, the tissue paper according to the present embodiment has a large elongation, a small slope, and a low tensile elasticity, and feels soft (FIG. 8).

As described above, the dry tensile strength of the tissue paper according to the present embodiment in the longitudinal direction is adjusted to 250 cN/25 mm or greater and 400 cN/25 mm or less. This makes it possible to obtain tissue paper that is less likely to be torn. Moreover, the tissue paper contains a softener, the tensile elasticity of the tissue paper is adjusted to 7 N/mm² or higher and 15 N/mm² or lower, and the TSA HF value of the tissue paper is adjusted to 80 or higher. This makes it possible to obtain tissue paper having excellent softness.

As described above, the tissue paper according to the present embodiment contains a softener containing an oil by 0.1% by mass or greater and 1.5% by mass or less, the oil being extractable with diethyl ether. This can improve softness of the tissue paper.

As described above, the TSA TS7 of the tissue paper according to the present embodiment is adjusted to 11 or lower. This can further improve softness of the tissue paper.

As described above, the TSA TS750 of the tissue paper according to the present embodiment is adjusted to 9.5 or lower. This makes it possible to obtain tissue paper having both excellent softness and excellent smoothness.

As described above, the arithmetic mean height of the tissue paper according to the present embodiment is adjusted to 3 μm or greater and 7 μm or less. This can further improve smoothness of the tissue paper.

As described above, the surface texture aspect ratio of the tissue paper according to the present embodiment is adjusted to 0.4 or less. This can further improve smoothness of the tissue paper.

<Method for Manufacturing Tissue Paper>

Figure 10:
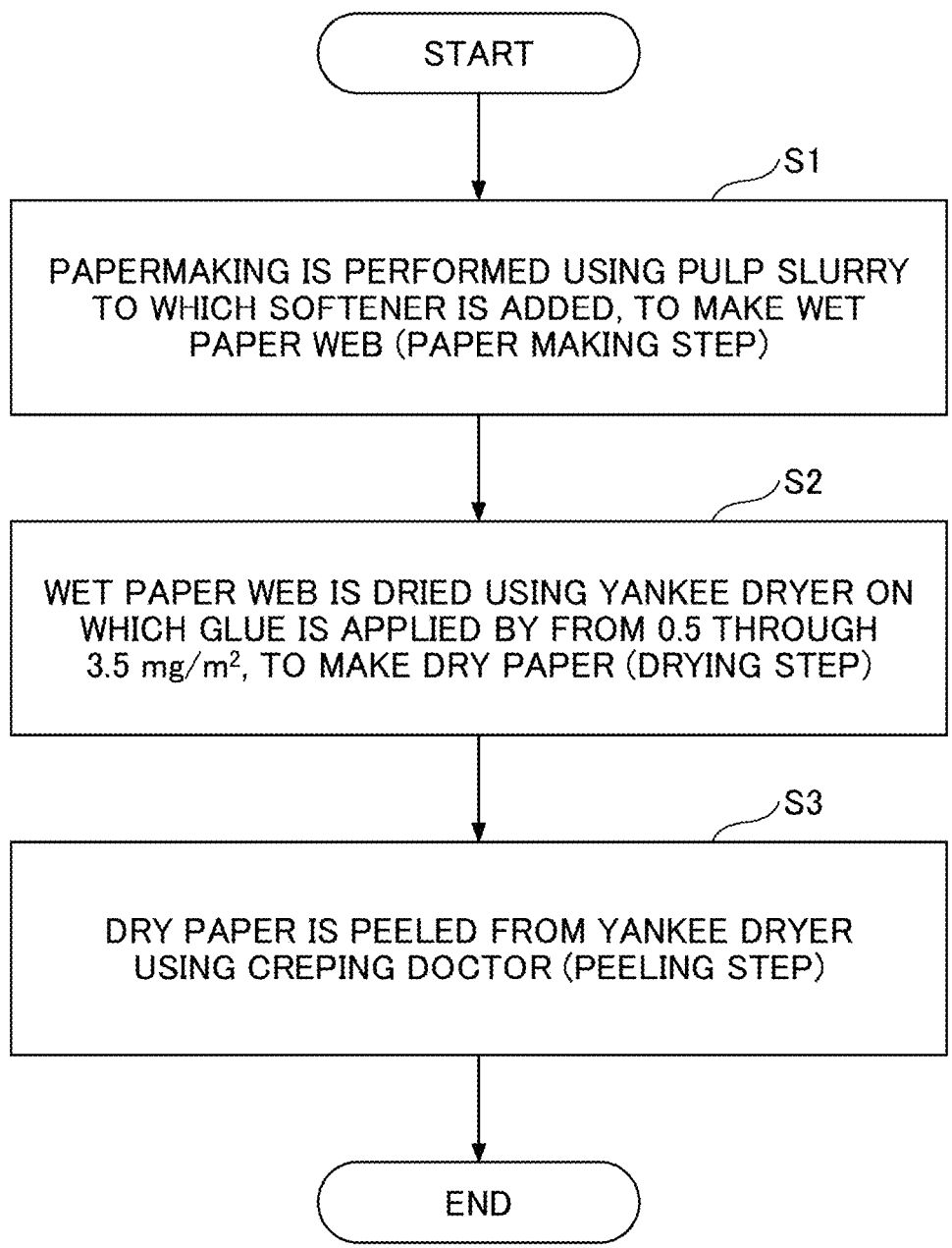
FIG. 10 is a flowchart for performing a method for manufacturing tissue paper according to an embodiment of the present invention.
Figure 11:
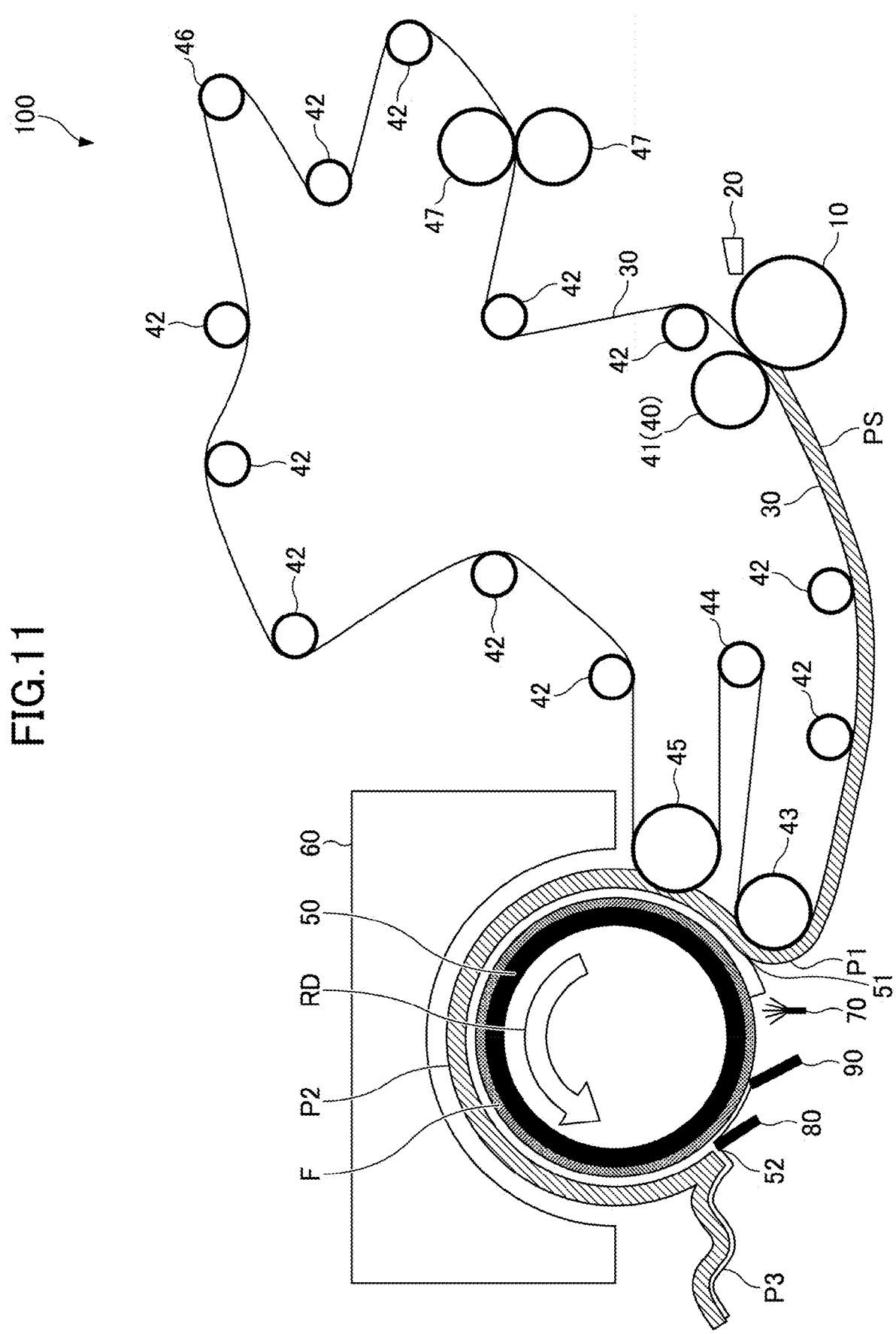
FIG. 11 is an exemplary view of an apparatus configured to manufacture tissue paper according to an embodiment of the present invention.
Figure 12:
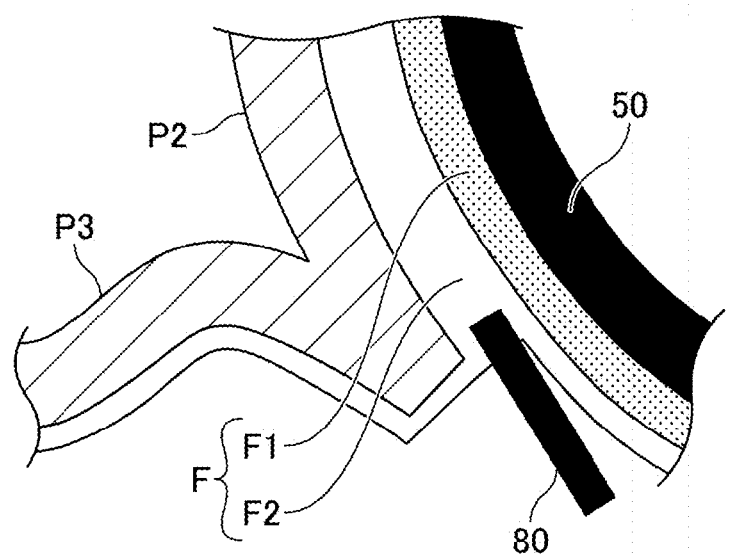
FIG. 12 is an enlarged view of a part of the apparatus illustrated in FIG. 11.

A method for manufacturing tissue paper according to the present embodiment will be described. FIG. 10 is a flowchart for performing the method for manufacturing tissue paper according to the present embodiment. FIG. 11 is a view of an example of an apparatus configured to manufacture tissue paper according to the present embodiment. FIG. 12 is an enlarged view of a part of the apparatus illustrated in FIG. 11. In these drawings, any common components will be denoted by the same reference numerals, and descriptions of such components may be skipped.

The method for manufacturing tissue paper according to the present embodiment is a method for manufacturing the tissue paper described above, and includes a paper making step S1, a drying step S2, and a peeling step S3 (FIG. 10). The method for manufacturing tissue paper according to the present embodiment is an example of the method for manufacturing tissue paper of the present invention.

The method for manufacturing tissue paper according to the present embodiment can be realized by, for example, an apparatus 100 configured to manufacture tissue paper illustrated in FIG. 11. The apparatus 100 illustrated in FIG. 11 includes a suction cylinder 10, a pulp slurry feeding unit 20, a blanket 30, a roll 40, a yankee dryer 50, a hot air hood 60, a glue feeding unit 70, a creping doctor 80, and a cleaning doctor 90.

Here, using the apparatus 100 illustrated in FIG. 11, the method for manufacturing tissue paper illustrated in FIG. 10 will be specifically described.

In the paper making step S1, papermaking is performed using a pulp slurry PS to which the softener described above is added, to make a wet paper web P1. Specifically, the pulp slurry PS is fed from the pulp slurry feeding unit 20 to the surface of the suction cylinder 10 that is rotating. The blanket 30 having a lengthy shape is conveyed along the roll 40 (conveying rolls 42). The conveying speed of the blanket 30 may be selected as desired, and is, for example, from 900 m/minute through 1,300 m/minute.

The fed pulp slurry PS is transferred onto the blanket 30 when the blanket 30 passes between the suction cylinder 10 and a couch roll 41. The pulp slurry PS transferred onto the blanket 30 is dehydrated while being conveyed to a touch roll 43, to become the wet paper web P1.

In the drying step S2, the wet paper web P1 is dried using the yankee dryer 50, to make dry paper P2. The wet paper web P1 is separated from the blanket 30 and glued to the surface of the yankee dryer 50 when passing between the touch roll 43 rotating relatively to the yankee dryer 50 and the surface, at an entrance side 51, of the yankee dryer 50 rotating relatively to the touch roll 43.

The blanket 30, from which the wet paper web P1 is separated, is conveyed to a hitch roll 44, and then conveyed to another touch roll 45, to pass again between the touch roll 45 and the surface of the yankee dryer 50. Here, part of the wet paper web P1 remaining on the blanket 30 is glued to the surface of the yankee dryer 50.

The blanket 30 is further conveyed to a stretch roll 46, and further conveyed in a stretched state to a squeeze roll 47 to be squeezed. The blanket 30 is conveyed in a squeezed state to between the suction cylinder 10 and the couch roll 41, and has the pulp slurry PS transferred and the paper making step S1 repeated again.

In the drying step S2, a glue is applied on the surface of the yankee dryer 50 before the wet paper web P1 passes between the touch roll 43 and the surface of the yankee dryer 50 at the entrance side 51. Specifically, the glue feeding unit 70 is provided between the entrance side 51 of the yankee dryer 50 and the cleaning doctor 90, and the glue is jetted from the glue feeding unit 70 onto the surface of the yankee dryer 50. As a result, the glue is applied on the surface of the yankee dryer 50, and a film (membrane F) of the glue is formed on the surface of the yankee dryer 50.

The component of the glue is not particularly limited. However, it is preferable that the glue contains a thermosetting polyamide-based resin. A thermosetting polyamide-based resin has a thermosetting property, and is heated and cures on the surface of the yankee dryer 50.

Here, when a thermosetting polyamide-based resin serving as the glue is applied on the surface of the yankee dryer 50, a part F1 of the membrane to be formed becomes hard near the yankee dryer 50, due to strong heating. Moreover, a part F2 of the membrane to be formed becomes soft at a dry paper side apart from the yankee dryer 50, due to weak heating (FIG. 12).

The thermosetting polyamide-based resin is not particularly limited. An example of the thermosetting polyamide-based resin is polyamine polyamide epichlorohydrin.

By controlling epichlorohydrin modification of polyamide polyamine epichlorohydrin (PAE), it is possible to control molecular weight, crosslink density, and cationic property of the resin. Moreover, by controlling the amount of azetidinium rings (AZR) to be formed in the resin, it is possible to adjust thermosetting property of the PAE. Furthermore, by adjusting thermosetting property of the thermosetting polyamide-based resin, it is possible to make the coating layer of the glue thick.

The amount of the glue to be applied on the surface of the yankee dryer 50 is 0.5 mg/m$^2$ or greater and 3.5 mg/m$^2$ or less, preferably 0.8 mg/m$^2$ or greater and 3.3 mg/m$^2$ or less, and yet more preferably 1 mg/m$^2$ or greater and 3 mg/m$^2$ or less on the surface of the yankee dryer 50.

In the present embodiment, the application amount of the glue is adjusted to from 1 kg/t through 4 kg/t relative to the mass (t) of the tissue paper P3 to be obtained. Here, the thickness of the membrane F formed on the surface of the yankee dryer 50 is estimated to be from 1 μm through 3.5 μm. The thickness of the membrane F is approximately five times greater than the thickness of an existing membrane to be formed on the surface of the yankee dryer 50 (see FIG. 12 to FIG. 15).

In the drying step S2, the wet paper web P1 passes through the hot air hood 60 in the state of being glued to the surface of the yankee dryer 50 rotating in the RD direction, and becomes dry paper P2 by the time the wet paper web is conveyed to an exit side 52 of the yankee dryer 50.

In the peeling step S3, the dry paper P2 conveyed to the exit side 52 of the yankee dryer 50 is peeled from the yankee dryer 50 by the creping doctor 80. Specifically, with an end of the creping doctor 80 set between the yankee dryer 50 and the dry paper P2, the dry paper P2 is separated from the yankee dryer 50 while being creped.

The dry paper P2 separated from the yankee dryer 50 becomes tissue paper P3. The crepe rate of the tissue paper P3 may be selected as desired, yet is preferably from 10% through 20%.

The yankee dryer 50, from which the dry paper P2 is separated, is conveyed to the cleaning doctor 90 and cleaned. Specifically, of the membrane F remaining on the surface of the yankee dryer 50, the soft membrane F2 is scraped away by the end of the cleaning doctor 90, and only the hard membrane F1 remains on the surface of the yankee dryer 50 (FIG. 12).

On the way on which the cleaned yankee dryer 50 is conveyed to the entrance side 51 of the yankee dryer 50, the glue is applied and a membrane F formed on the surface of the yankee dryer 50 again. The yankee dryer 50, which has the membrane F formed on the surface, is conveyed to the entrance side 51, and a wet paper web P1 is glued to the surface of the yankee dryer 50 again and the drying step S2 is repeated.

Figure 13:
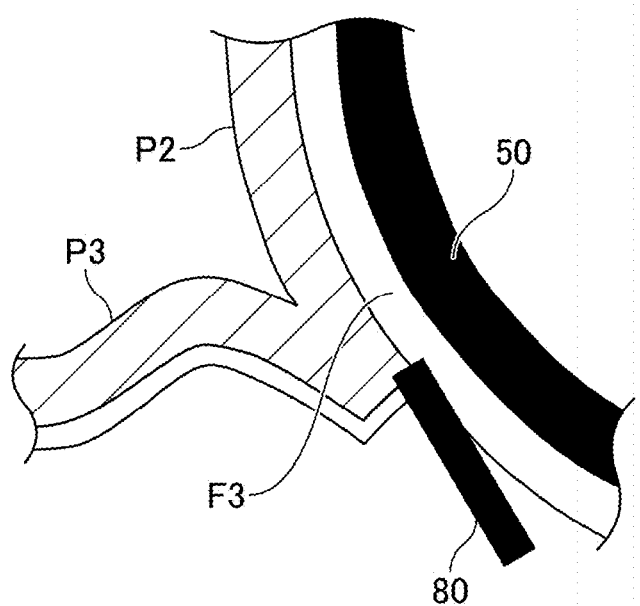
FIG. 13 is a view illustrating a part of an existing apparatus configured to manufacture tissue paper.

According to an existing method of manufacturing tissue paper, there is a case where a thin, soft membrane F3 is formed on the yankee dryer 50 (FIG. 13). According to this manufacturing method, since the membrane F3 is thin, the end of the creping doctor 80 touches the dry paper P2 and worsens the paper quality of the surface. Moreover, as being soft, the membrane F3 tends to peel from the surface of the yankee dryer 50, consequently making the wet paper web P1 or the dry paper P2 insufficiently glue to the yankee dryer 50.

Figure 14:
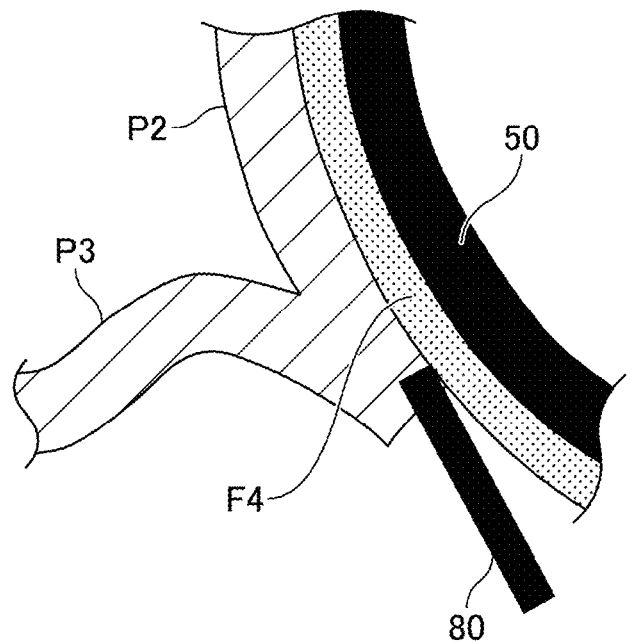
FIG. 14 is a view illustrating a part of an existing apparatus configured to manufacture tissue paper.

Moreover, according to the existing method of manufacturing tissue paper, there is a case where a thin, hard membrane F4 is formed on the yankee dryer 50 (FIG. 14). According to this manufacturing method, as peeling of the dry paper P2 occurs between the thin, hard membrane F4 and the dry paper P2, crepes become large, consequently worsening the surface condition and hardening the paper quality.

Figure 15:
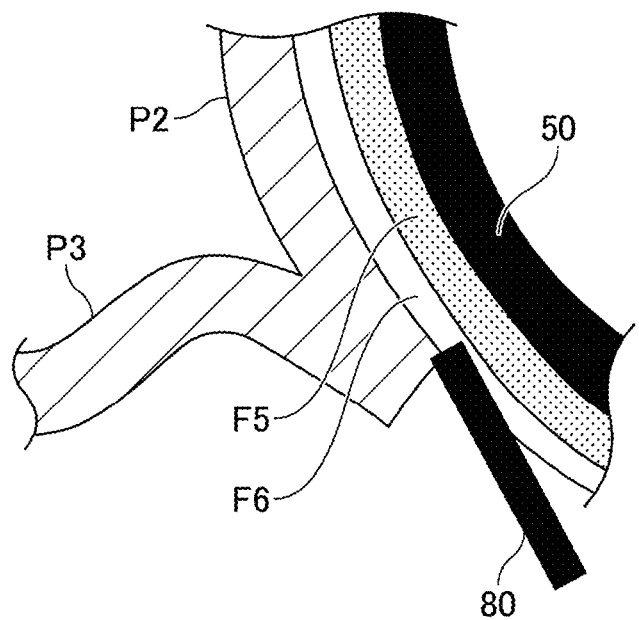
FIG. 15 is a view illustrating a part of an existing apparatus configured to manufacture tissue paper.

Moreover, according to the existing method of manufacturing tissue paper, there is a case where a hard membrane F5 and a release layer F6 are formed on the yankee dryer 50 (FIG. 15). According to this manufacturing method, the release layer F6 facilitates peeling of the dry paper P2 from the yankee dryer 50, which makes crepes small and the surface condition good, but makes the paper quality hard.

As compared with this, according to the manufacturing method of the present embodiment, the glue is applied on the surface of the yankee dryer 50 by 0.5 mg/m$^2$ or greater and 3.5 mg/m$^2$ or less as described above. This makes it possible to form a thick membrane F on the surface of the yankee dryer 50 (FIG. 11 and FIG. 12). Owing to this thick membrane F, the end of the creping doctor 80 bites into between the yankee dryer 50 and the dry paper P2, so the dry paper P2 is peeled while the surface of the dry paper P2 is protected by the membrane F in the peeling step S3. As a result, tissue paper having uniform and minute crepes is obtained.

According to the manufacturing method of the present embodiment, owing to the thick membrane F formed on the surface of the yankee dryer 50, the surface of the yankee dryer 50 can avoid being contacted or abutted against by the end of the creping doctor 80 in the peeling step S3. Hence, according to the manufacturing method of the present embodiment, the surface of the yankee dryer 50 can be protected by means of the thick membrane F.

According to the manufacturing method of the present embodiment, owing to the thick membrane F formed between the surface of the yankee dryer 50 and the dry paper P2, the dry paper P2 is creped via the membrane F as described above. Moreover, the end of the creping doctor 80 tends not to contact the surface of the yankee dryer 50. Hence, in the peeling step S3, the yankee dryer 50 itself can also be protected.

According to the manufacturing method of the present embodiment, a thermosetting polyamide-based resin is contained in the glue to be applied on the surface of the yankee dryer 50. Hence, when a thick membrane F is formed on the surface of the yankee dryer 50, a part F1 of the membrane F becomes hard due to strong heating near the yankee dryer 50, whereas a part F2 of the membrane F becomes soft due to weak heating at the dry paper P2 side apart from the yankee dryer 50.

Hence, according to the manufacturing method of the present embodiment, the soft membrane F2 formed on the surface of the yankee dryer 50 facilitates gluing of the dry paper P2 and pickup of the dry paper P2 (gluing of the wet paper web P1 to the yankee dryer 50) in the drying step S2. Moreover, the hard membrane F1 formed on the surface of the yankee dryer 50 can enhance protection of the surface of the yankee dryer 50.

EXAMPLES

The present invention will be specifically described below by way of Examples. Evaluations of Examples and Comparative Examples were performed by the tests described below.

[Tissue Paper (Test Specimen)]

Tissue paper was manufactured by the manufacturing method of FIG. 11, and used as test specimens.

[Surface Roughness (Arithmetic Mean Height, Surface Texture Aspect Ratio)]

Surface roughness was measured using a one-shot 3D shape measuring instrument VR-3200 and image analyzing software VR-H2A obtained from Keyence Corporation. Surface roughness was measured at a magnification of ×12 with a field of view area of 30 mm×30 mm. Arithmetic mean height and surface texture aspect ratio were calculated from the obtained surface roughness. The arithmetic mean height was obtained as the mean of the absolute values of the height differences of individual points from the mean plane of the surface. The surface texture aspect ratio was obtained as a value in the range of from 0 through 1 as surface texture isotropy or anisotropy.

[Basis Weight (Paper Density)]

The basis weight (paper density) of the tissue paper was measured in accordance with the rule of JIS P 8124. The unit of the basis weight was g/m$^2$.

[Paper Thickness]

The thickness of the tissue paper was measured in accordance with the rule of JIS P 8111 (1998). The unit of the thickness was μm.

[Dry Tensile Strength]

Dry tensile strength was measured in accordance with the rule of JIS P 8113 (1998). As the test pieces, those that were cut to have a width of approximately 25 mm (±0.5 mm) in either of the longitudinal direction (MD direction) and the transverse direction (CD direction) and a length of approximately 150 mm in the other of the longitudinal direction (MD direction) and the transverse direction (CD direction) were used. As the tester, a load cell tensile tester TG-200N obtained from Minebea Co., Ltd. was used. Dry tensile strength was measured according to the procedure of setting the free length of the test piece between grips to 100 mm, fastening both ends of the test piece to the grips of the tester, applying a tensile load to the paper piece in the vertical direction, and reading the indicated value (digital value) when the paper would be broken. The tensile speed was set to 100 mm/min. Five specimens (each was a paired specimen) were prepared for each of the longitudinal direction and the transverse direction, and the measurement was performed five times in each direction. The average of the measured values was obtained as the dry tensile strength in each direction. The longitudinal-transverse ratio was calculated as the ratio of the tensile strength in the longitudinal direction to the tensile strength in the transverse direction.

[Rate of Elongation]

Rate of elongation in the longitudinal direction was measured using a universal tensile compression tester TG-200N obtained from MinebeaMitsumi Inc.).

[Tensile Elasticity]

Using a tensile compression tester TGE-200N obtained from MinebeaMitsumi Inc., tensile strength in the longitudinal direction was measured while the measurement test piece sample having a width of 25 mm and a paper thickness of 125 μm (on the average) was sandwiched from above and below between chucks (having a distance of 100 mm between the chucks). Tensile elasticity was calculated according to Formula: "Maximum slope (N/mm) of elongation-tensile strength curve×distance (mm) between chucks/width (mm) of test piece/thickness (mm) of test piece".

[Tsa Measurement]

Hand-feel value HF, softness peak TS7, and smoothness peak TS750 were measured using a Tissue Softness Analyzer (TSA) obtained from Emtec Electronic GmbH.

[Extractable Oil]

A test specimen was immersed in diethyl ether, and the amount of the oil to be extracted (extractable oil) was calculated as a ratio to the weight of the paper.

[Sensory Test]

Softness, moist feeling, smoothness, and thickness feeling were both evaluated and comprehensively evaluated. When the comprehensive evaluation was 4.5 or greater, the test specimen was evaluated as good.

Examples and Comparative Examples will be described below.

Example 1

A test specimen adjusted to an arithmetic mean height of 5.5 μm, a surface texture aspect ratio of 0.25, a basis weight of 12.2 g/m², a paper thickness of 131 μm, a dry tensile strength (longitudinal) of 289 cN, a dry tensile strength (transverse) of 126 cN, a rate of elongation (longitudinal) of 13.2%, a tensile elasticity of 8.8 N/mm², a HF value of 82.4, a TS7 value of 10.8, a TS750 value of 8.2, and an extractable oil of 1.3% was evaluated. The results are presented in Table 1.

Example 2

A test specimen adjusted to an arithmetic mean height of 5.6 μm, a surface texture aspect ratio of 0.2, a basis weight of 12.1 g/m², a paper thickness of 123 μm, a dry tensile strength (longitudinal) of 345 cN, a dry tensile strength (transverse) of 128 cN, a rate of elongation (longitudinal) of 11.7%, a tensile elasticity of 10.7 N/mm², a HF value of 83.5, a TS7 value of 10.4, a TS750 value of 9.4, and an extractable oil of 1.3% was evaluated. The results are presented in Table 1.

Comparative Example 1

A test specimen adjusted to an arithmetic mean height of 5.3 μm, a surface texture aspect ratio of 0.34, a basis weight of 12 g/m², a paper thickness of 131 μm, a dry tensile strength (longitudinal) of 272 cN, a dry tensile strength (transverse) of 125 cN, a rate of elongation (longitudinal) of 7.9%, a tensile elasticity of 16.6 N/mm², a HF value of 79.5, a TS7 value of 11.5, a TS750 value of 9.3, and an extractable oil of 1% was evaluated. The results are presented in Table 1.

Comparative Example 2

A test specimen adjusted to an arithmetic mean height of 5.9 μm, a surface texture aspect ratio of 0.48, a basis weight of 10.5 g/m², a paper thickness of 112 μm, a dry tensile strength (longitudinal) of 408 cN, a dry tensile strength (transverse) of 132 cN, a rate of elongation (longitudinal) of 10.5%, a tensile elasticity of 17.8 N/mm², a HF value of 73.8, a TS7 value of 14, a TS750 value of 10.8, and an extractable oil of 0% was evaluated. The results are presented in Table 1.

Comparative Example 3

A test specimen adjusted to an arithmetic mean height of 7.2 μm, a surface texture aspect ratio of 0.47, a basis weight of 13.4 g/m², a paper thickness of 140 μm, a dry tensile strength (longitudinal) of 349 cN, a dry tensile strength (transverse) of 115 cN, a rate of elongation (longitudinal) of 17.2%, a tensile elasticity of 9.6 N/mm², a HF value of 77.8, a TS7 value of 13.4, a TS750 value of 9.9, and an extractable oil of 0.7% was evaluated. The results are presented in Table 1.

Comparative Example 4

A test specimen adjusted to an arithmetic mean height of 7.7 μm, a surface texture aspect ratio of 0.39, a basis weight of 12.3 g/m², a paper thickness of 125 μm, a dry tensile strength (longitudinal) of 236 cN, a dry tensile strength (transverse) of 123 cN, a rate of elongation (longitudinal) of 11.6%, a tensile elasticity of 9.7 N/mm², a HF value of 82.1, a TS7 value of 10.8, a TS750 value of 9.5, and an extractable oil of 0.5% was evaluated. The results are presented in Table 1.

TABLE 1

| | | Ex. 1 | Ex. 2 | Comp. Ex. 1 | Comp. Ex. 2 | Comp. Ex. 3 | Comp. Ex. 4 |
|---|---|---|---|---|---|---|---|
| Surface roughness | Arithmetic mean height [μm] | 5.5 | 5.6 | 5.3 | 5.9 | 7.2 | 7.7 |
| | Surface texture aspect ratio | 0.25 | 0.2 | 0.34 | 0.48 | 0.47 | 0.39 |
| Basis weight [g/m²] | | 12.2 | 12.1 | 12 | 10.5 | 13.4 | 12.3 |
| Paper thickness [μm] | | 131 | 123 | 131 | 112 | 140 | 125 |
| Dry tensile strength longitudinal [cN] | | 289 | 345 | 272 | 408 | 349 | 236 |
| Dry tensile strength transvere [cN] | | 126 | 128 | 125 | 132 | 115 | 123 |
| Rate of elongation longitudinal [%] | | 13.2 | 11.7 | 7.9 | 10.5 | 17.2 | 11.6 |
| Tensile elasticity [N/mm²] | | 8.8 | 10.7 | 16.6 | 17.8 | 9.6 | 9.7 |
| TSA measurement | HF value | 82.4 | 83.5 | 79.5 | 73.8 | 77.8 | 82.1 |
| | TS7 value | 10.8 | 10.4 | 11.5 | 14 | 13.4 | 10.8 |
| | TS750 value | 8.2 | 9.4 | 9.3 | 10.8 | 9.9 | 9.5 |
| Extractable oil content [%] | | 1.3 | 1.3 | 1 | 0 | 0.7 | 0.5 |
| Sensory test | Softness | 4.5 | 4.2 | 3.8 | 3.5 | 4 | 4 |
| | Moist feeling | 4.6 | 4.7 | 4.5 | 3.3 | 4 | 4 |
| | Smoothness | 4.9 | 5.1 | 5.1 | 4.5 | 4 | 4.6 |
| | Thickness feeling | 4.1 | 4.5 | 4.5 | 3.5 | 4 | 4.6 |
| | Total evaluation | 4.8 | 5.1 | 4.4 | 3.7 | 4 | 4.4 |

From Table 1, tissue paper adjusted to an arithmetic mean height of from 5.5 μm through 5.6 μm, a surface texture aspect ratio of from 0.2 through 0.25, a basis weight of from 12.1 g/m² through 12.2 g/m², a paper thickness of from 123 μm through 131 μm, a dry tensile strength (longitudinal) of from 289 cN through 345 cN, a dry tensile strength (transverse) of from 126 cN through 128 cN, a rate of elongation (longitudinal) of from 11.7% through 13.2%, a tensile elasticity of from 8.8 N/mm² through 10.7 N/mm², a HF value of from 82.4 through 83.5, a TS7 value of from 10.4 through 10.8, a TS750 value of from 8.2 through 9.4, and an extractable oil of 1.3% was given a total evaluation of 4.5 or higher (Examples 1 and 2).

As compared with this, tissue paper having an arithmetic mean height, a surface texture aspect, a dry tensile strength (longitudinal), a tensile elasticity, a HF value, a TS7 value, a TS750 value, and an extractable oil, at least any of which fell out of the ranges of Examples 1 and 2, was given a comprehensive evaluation of lower than 4.5 (Comparative Examples 1 to 4).

From these results, tissue paper containing a softener containing diethyl ether-extractable oil by 0.1% by mass or greater and 1.5% by mass or less, and having a dry tensile strength of 250 cN/25 mm or greater and 400 cN/25 mm or less in the longitudinal direction, a tensile elasticity of 7 N/mm$^2$ or higher and 15 N/mm$^2$ or lower, a TSA HF value of 80 or higher, a TSA TS7 of 11 or lower, a TSA-measured smoothness peak TS750 of 9.5 or lower, an arithmetic mean height of 3 μm or greater and 7 μm or less, and a surface texture aspect ratio or 0.4 or less can be said to have excellent softness and excellent smoothness.

An embodiment of the present invention has been described above. The present invention is not limited to the specific embodiment, but various modifications and changes can be made within the scope of the invention described in the claims.

Preferred aspects of the present invention will be appended.

According to a first aspect of the present invention, tissue paper containing a softener, and having a dry tensile strength of 250 cN/25 mm or greater and 400 cN/25 mm or less in a longitudinal direction, a tensile elasticity of 7 N/mm$^2$ or higher and 15 N/mm$^2$ or lower, and a hand-feel value HF of 80 or higher, where the hand-feel value is measured using a softness analyzer (TSA), is provided.

According to the first aspect, it is possible to obtain tissue paper that does not easily tear, by setting the dry tensile strength in the longitudinal direction to 250 cN/25 mm or greater and 400 cN/25 mm or less. Moreover, it is possible to obtain tissue paper having excellent softness, by making the tissue paper contain a softener, setting the tensile elasticity to 7 N/mm$^2$ or higher and 15 N/mm$^2$ or lower, and setting the TSA HF value to 80 or higher.

According to a second aspect of the present invention, tissue paper, in which the softener contains a diethyl ether-extractable oil by 0.1% by mass or greater and 1.5% by mass or less in the softener, is provided. According to the second aspect, it is possible to improve softness of the tissue paper by making the tissue paper contain a softener containing a diethyl ether-extractable oil by 0.1% by mass or greater and 1.5% by mass or less in the softener.

According to a third aspect of the present invention, tissue paper having a softness peak TS7 of 11 or lower, where the softness peak TS7 is measured using the softness analyzer (TSA), is provided. According to the third aspect, it is possible to further improve softness of the tissue paper by setting the TSA TS7 to 11 or lower.

According to a fourth aspect of the present invention, tissue paper having a smoothness peak TS750 of 9.5 or lower, where the smoothness peak TS750 is measured using the softness analyzer (TSA), is provided. According to the fourth aspect, it is possible to obtain tissue paper having both excellent softness and excellent smoothness by setting the TSA TS750 to 9.5 or lower.

According to a fifth aspect of the present invention, tissue paper having an arithmetic mean height of 3 μm or greater and 7 μm or less is provided. According to the fifth embodiment, it is possible to further improve smoothness of the tissue paper by setting the arithmetic mean height to 3 μm or greater and 7 μm or less.

According to a sixth aspect of the present invention, tissue paper having an aspect ratio of 0.4 or less is provided. According to the sixth aspect, it is possible to further improve smoothness of the tissue paper by setting the surface texture aspect ratio to 0.4 or less.

According to a seventh aspect of the present invention, a method for manufacturing the tissue paper of any of the first to sixth aspects described above, including a paper making step of performing papermaking using a pulp slurry to which the softener is added, to make a wet paper web, a drying step of drying the wet paper web using a yankee dryer, to make dry paper, and a peeling step of peeling the dry paper from the yankee dryer using a creping doctor, where a glue is applied on the surface of the yankee dryer by 0.5 mg/m$^2$ or greater and 3.5 mg/m$^2$ or less, is provided.

According to the seventh aspect, it is possible to form a thick membrane on the surface of the yankee dryer, since the glue is applied on the surface of the yankee dryer by 0.5 mg/m$^2$ or greater and 3.5 mg/m$^2$ or less. In the peeling step, owing to this thick membrane, an end of the creping doctor bites into between the yankee dryer and the dry paper, so the dry paper is peeled while the surface of the dry paper is protected by the membrane. As a result, tissue paper having uniform and minute crepes is obtained.

According to the seventh aspect, owing to the thick membrane formed on the surface of the yankee dryer, contact between the surface of the yankee dryer and the end of the creping doctor may be avoided in the peeling step. Therefore, according to the seventh aspect, the surface of the yankee dryer can be protected by the thick membrane.

Moreover, according to the seventh aspect, owing to the thick membrane formed between the surface of the yankee dryer and the dry paper, the dry paper is creped via the membrane as described above, and the yankee dryer itself can also be protected in the peeling step because the end of the creping doctor tends not to contact the surface of the yankee dryer.

According to an eighth aspect of the present invention, a method for manufacturing tissue paper, wherein the glue contains a thermosetting polyamide-based resin, is provided. When a thick membrane is to be formed on the surface of the yankee dryer, a thermosetting polyamide-based resin contained in the glue applied on the surface of the yankee dryer makes a part of the membrane hard near the yankee dryer due to strong heating, yet makes a part of the membrane soft at the dry paper side apart from the yankee dryer due to weak heating.

Hence, according to the eighth aspect, the soft membrane formed on the surface of the yankee dryer facilitates gluing of the dry paper and pickup of the dry paper (gluing of the wet paper web to the yankee dryer) in the drying step. Moreover, the hard membrane formed on the surface of the yankee dryer can enhance protection of the surface of the yankee dryer.

The present application claims priority based on the Japanese patent application No. 2020-198096 filed on Nov. 30, 2020, the entire contents of which are incorporated herein by reference.

DESCRIPTION OF THE REFERENCE NUMERALS

100: apparatus
10: suction cylinder
20: pulp slurry feeding unit
30: blanket
40: roll
41: couch roll
42: conveying roll
43: touch roll 44: hitch roll
45: touch roll
46: stretch roll
47: squeeze roll
50: yankee dryer
51: entrance side
52: exit side
60: hot air hood
70: glue feeding unit
80: creping doctor
90: cleaning doctor
PS: pulp slurry
P1: wet paper web
P2: dry paper
P3: tissue paper
F F1, F2: membrane
MD: longitudinal direction (flow direction)
CD: transverse direction (direction orthogonal to flow direction)

The invention claimed is:

1. Tissue paper, comprising:
   a softener,
   wherein the tissue paper has a dry tensile strength of 250 cN/25 mm or greater and 400 cN/25 mm or less in a longitudinal direction, a tensile elasticity of 7 N/mm² or higher and 15 N/mm² or lower, and a hand-feel value HF of 80 or higher, where the hand-feel value is measured using a tissue softness analyzer (TSA), and a softness peak TS7 of the tissue paper measured using the TSA is 10.8 or lower.

2. The tissue paper according to claim 1, wherein the softener contains an oil by 0.1% by mass or greater and 1.5% by mass or less in the softener, the oil being extractable with diethyl ether.

3. The tissue paper according to claim 1, wherein a smoothness peak TS750 of the tissue paper measured using the TSA is 9.5 or lower.

4. The tissue paper according to claim 1, wherein an arithmetic mean height of the tissue paper is 3 μm or greater and 7 μm or less.

5. The tissue paper according to claim 1, wherein an aspect ratio of the tissue paper is 0.4 or less.

6. A method for manufacturing the tissue paper of claim 1, the method comprising:
   performing papermaking using a pulp slurry to which the softener is added, to make a wet paper web;
   drying the wet paper web using a yankee dryer, to make dry paper; and
   peeling the dry paper from the yankee dryer using a creping doctor,
   wherein a glue is applied on a surface of the yankee dryer by 0.5 mg/m² or greater and 3.5 mg/m² or less.

7. The method for manufacturing the tissue paper according to claim 6, wherein the glue contains a thermosetting polyamide-based resin.

* * * * *